(12) United States Patent
Kob et al.

(10) Patent No.: US 9,266,242 B2
(45) Date of Patent: Feb. 23, 2016

(54) GRIPPER

(71) Applicant: FIPA GmbH, Ismaning (DE)

(72) Inventors: Roland Kob, Erding (DE); Stephan Eifler, München (DE)

(73) Assignee: FIPA GmbH, Ismaning (DE)

( * ) Notice: Subject to any disclaimer, the term of this patent is extended or adjusted under 35 U.S.C. 154(b) by 0 days.

(21) Appl. No.: 14/649,681

(22) PCT Filed: Nov. 13, 2013

(86) PCT No.: PCT/EP2013/073752
§ 371 (c)(1),
(2) Date: Jun. 4, 2015

(87) PCT Pub. No.: WO2014/095169
PCT Pub. Date: Jun. 26, 2014

(65) Prior Publication Data
US 2015/0321358 A1    Nov. 12, 2015

(30) Foreign Application Priority Data

Dec. 18, 2012   (DE) .................... 20 2012 012 083 U

(51) Int. Cl.
*B25J 15/02*   (2006.01)
*B25J 15/00*   (2006.01)
*B25J 15/08*   (2006.01)

(52) U.S. Cl.
CPC ............ *B25J 15/0028* (2013.01); *B25J 15/086* (2013.01)

(58) Field of Classification Search
CPC ... B25J 15/0028; B25J 15/086; B25J 15/0273
USPC ........ 294/203, 115, 98.1, 208, 198, 202, 192; 901/37, 36
See application file for complete search history.

(56) References Cited

U.S. PATENT DOCUMENTS

| 4,234,223 A | * | 11/1980 | O'Neil | ................. | B25J 15/0206 |
|---|---|---|---|---|---|
| | | | | | 294/116 |
| 4,428,710 A | * | 1/1984 | Grisebach | .................. | B25J 9/04 |
| | | | | | 414/590 |

(Continued)

FOREIGN PATENT DOCUMENTS

| DE | 8126888 U1 | 4/1982 |
|---|---|---|
| DE | 8908253 U1 | 8/1989 |

(Continued)

OTHER PUBLICATIONS

Search Report, International Application No. PCT/EP2013/073752, Feb. 18, 2014.

*Primary Examiner* — Gabriela Puig
(74) *Attorney, Agent, or Firm* — Michael Best & Friedrich LLP

(57) ABSTRACT

A gripper (1), in particular a pneumatically actuated gripper, with a housing (2), in which a preferably pneumatically actuable linear drive (6) is formed. The gripper also has first and second gripping jaws (10, 20), which are respectively mounted pivotably in relation to the housing (2) about a pivot axis (D1, D2). The first and second gripping jaws (10, 20) are coupled to the linear drive (6) in such a way that a linear movement produced by the linear drive (6) is respectively converted into a pivoting movement of the first and second gripping jaws (10, 20) in an opening or closing direction of the gripping jaws (10, 20). In order to ensure reliable gripping, the first and second gripping jaws (10, 20) are coupled to one another by way of a synchronizing element (5) in such a way that, when the linear drive (6) is actuated, the pivoting movements of the first and second gripping jaws (10, 20) are synchronized.

20 Claims, 4 Drawing Sheets

(56) References Cited

U.S. PATENT DOCUMENTS

| | | | |
|---|---|---|---|
| 4,492,400 A | 1/1985 | Yuda | |
| 4,566,727 A | 1/1986 | Yuda | |
| 4,784,422 A * | 11/1988 | Jones | B25J 15/0028 294/106 |
| 5,503,378 A | 4/1996 | Schauss et al. | |
| 5,588,688 A * | 12/1996 | Jacobsen | A61F 2/588 294/106 |
| 5,938,257 A * | 8/1999 | Blatt | B25J 15/0273 294/119.1 |
| 6,092,848 A | 7/2000 | Maffeis et al. | |
| 6,145,904 A | 11/2000 | Bellandi et al. | |
| 2005/0046212 A1 * | 3/2005 | Maffeis | B25J 15/0206 294/203 |
| 2007/0028435 A1 * | 2/2007 | Ormachea | B68G 7/05 29/91 |
| 2009/0108605 A1 * | 4/2009 | Becker | B25J 9/142 294/198 |
| 2009/0133524 A1 * | 5/2009 | Fukano | B25J 15/0273 74/479.01 |
| 2013/0088031 A1 * | 4/2013 | Jones | G01N 35/0099 294/203 |

FOREIGN PATENT DOCUMENTS

| | | | |
|---|---|---|---|
| DE | 9000559 U1 | 3/1990 | |
| DE | 9214806 U1 | 1/1993 | |
| DE | 102004062611 A1 | 7/2006 | |
| IT | DE 19855630 B4 * | 6/2007 | B25J 15/0213 |

* cited by examiner

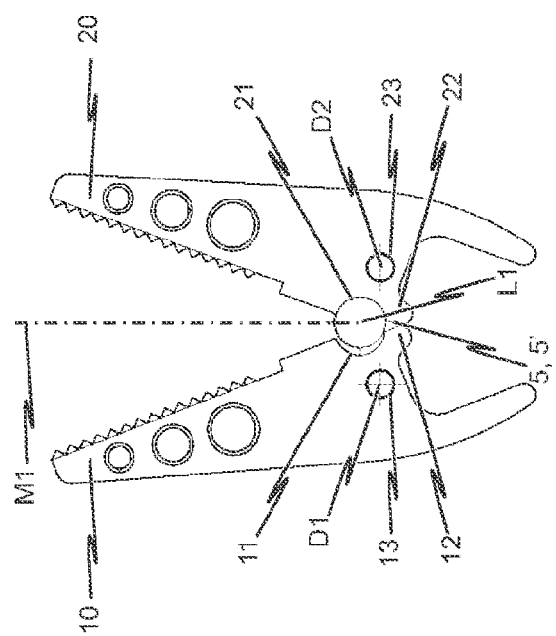
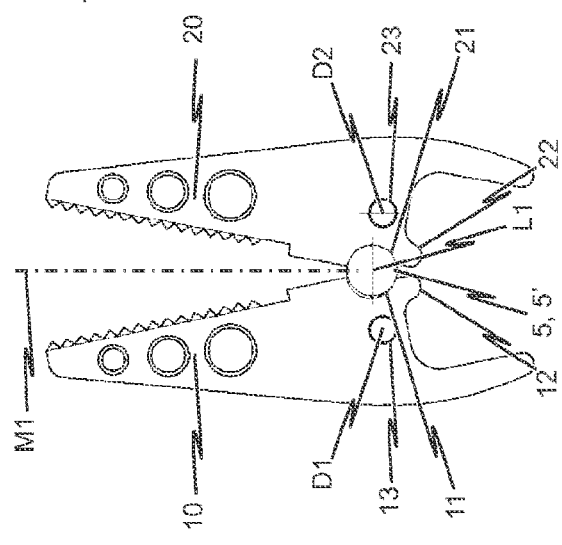
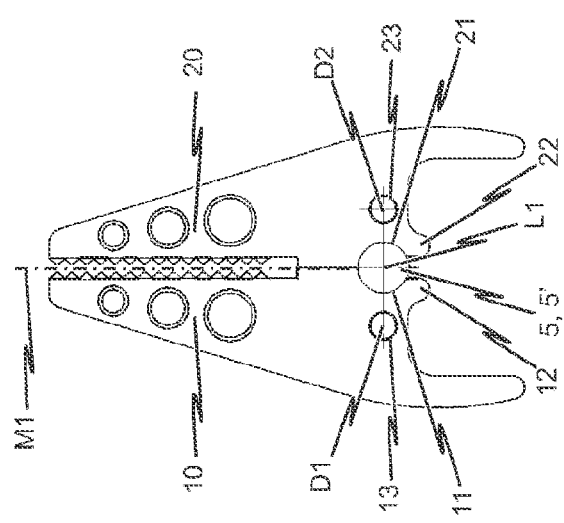

GRIPPER

CROSS REFERENCE TO RELATED APPLICATIONS

This application claims priority under 35 U.S.C. §119 to PCT Application Number PCT/EP2013/073752 filed Nov. 13, 2013 which claims priority to German patent document DE202012012083.2, the entire contents of which are hereby incorporated by reference herein.

BACKGROUND

Grippers are essentially known in the prior art. An example would be printed publication DE 198 55 630 B4, which relates to a pneumatically actuated gripper of the above type.

SUMMARY

Such grippers are frequently used in conjunction with industrial robots to manipulate various objects. Typically, the gripper has two pincer-like rigid jaws pivotable counter to one another or linearly displaceable counter to one another by longitudinal guides, which grasp and clamp an object to be gripped from opposite sides by opposing gripping surfaces.

Maximum reliability of the gripper is desirable so that objects will on the one hand not be damaged while being held between the gripping jaws and, on the other, by being clamped. Then again, such grippers, which are sometimes also referred to as "gripping tongs," should be of compact design and of the lowest weight possible in proportion to high gripping strength so they will be highly versatile, particularly also as an automated gripping tool in robotic applications.

The invention accordingly relates to a gripper, particularly a pneumatically actuated gripper, wherein the gripper has a housing in which a preferably pneumatically actuable linear drive is disposed. The gripper further comprises first and second gripping jaws, each mounted so as to be pivotable about a rotational axis relative to the housing. The first and second gripping jaws are coupled to the linear drive such that a linear movement produced by the linear drive is converted into a pivoting movement of the respective first and second gripping jaws in an opening or closing direction of said gripping jaws.

The invention is accordingly based on the task of further developing a gripper of the type cited at the outset to the effect that despite having a simple structure, it can grasp objects in particularly reliable manner. In particular, a gripper is to be provided in which the gripping jaws can be pivoted into an opening and closing direction pursuant to a predefined or predefinable sequence of events in an easily implemented manner.

The invention accordingly proposes a gripper, particularly a pneumatically actuated gripper, wherein said gripper has a housing in which a preferably pneumatically actuable linear drive is disposed, as well as a first and a second gripping jaw, each mounted so as to be pivotable about a rotational axis relative to the housing. The first and second gripping jaws are coupled to the linear drive such that a linear movement produced by the linear drive is converted into a pivoting movement of the respective first and second gripping jaws in an opening or closing direction of said gripping jaws. In order to optimize the reliability of the gripping process, the invention provides for the first and second gripping jaw to be coupled together by means of a synchronizing element such that upon the linear drive being actuated, the pivoting movements of the first and second gripping jaws are synchronized.

The provision of a synchronizing element, by means of which the two gripping jaws of the gripper are coupled to one another so that the pivoting movements of the two gripping jaws will be synchronized upon actuation of the linear drive, ensures in a readily realizable yet effective manner that the two gripping jaws are always pivoted together synchronously and coordinated, thus enabling reliable gripping.

Accordingly, in one preferential realization of the inventive gripper, the two gripping jaws are of mirror-symmetrical configuration with respect to a center longitudinal axis of the gripper. It is hereby in particular conceivable for the gripping jaws to adapt to the contour of the object to be grasped and provide for example a large contact area or even a positive-fit connection of gripping jaw and object, whereby the gripping pressure can conceivably be kept low, which is advantageous when gripping fragile objects.

One particularly preferential realization of the inventive solution provides for the synchronizing element to comprise a circular cylindrical section, the longitudinal axis of which runs parallel to the rotational axes of the first and second gripping jaws. It is particularly preferential for the circular cylindrical section to be disposed such that the longitudinal axis of said circular cylindrical section intersects the center longitudinal axis of the gripper perpendicularly. Doing so achieves a symmetrical configuration to the gripper, which is advantageous in terms of compact design.

A preferential further development of the latter embodiment in which the synchronizing element comprises a circular cylindrical section provides for a respective circularly segmented cut-out adapted to the diameter of the circular cylindrical section to be formed in the first and second gripping jaw into which the circular cylindrical section is or can be accommodated. It makes particular sense here for the circular cylindrical section to be removably accommodated in the two circularly segmented cut-outs of the gripping jaws.

The synchronizing element and particularly the circular cylindrical section synchronize the movements of the two gripping jaws with one another. Particularly the provision of the circular cylindrical section accommodated in the two circularly segmented cut-outs of the gripping jaws easily and yet effectively achieves a self-centering of the gripping jaws. Because a preferential realization of the inventive gripper provides for the circular cylindrical section to be removably accommodated in the two circularly segmented cut-outs of the gripping jaws, said circular cylindrical section can also be optionally removed from the gripper, wherein doing so does not affect the basic function of the gripper, that of gripping an object or objects. Removing the circular cylindrical section only disables the synchronizing and self-centering function of the two gripper jaws.

In order to achieve a particularly compact design, one further development of the latter embodiment provides for the longitudinal axis of the circular cylindrical section and the rotational axes of the first and second gripping jaws to lie in the same plane when the two gripping jaws are in the closed state. Of course, other embodiments are also conceivable here.

In order to be able to achieve the realizing of a pivoting movement of the two gripping jaws by means of the preferably pneumatically actuable linear drive disposed in the gripper housing, one preferential realization of the inventive solution provides for the first and second gripping jaw to each exhibit a projection eccentrically disposed to the respective gripping jaw rotational axis and facing the linear drive, by means of which a linear force is introduced into the respective gripping jaw upon the actuation of the linear drive. By introducing the force of the linear drive into the respective gripping jaw projection, which is arranged eccentrically with respect to the respective gripping jaw rotational axis, the linear force produced by the linear drive can be easily converted into a pivoting motion. Doing so can thus particularly eliminate the need for a complex force-transmitting mechanism as for example proposed by printed publication DE 198 55 630 B4.

It is particularly advantageous in the latter embodiment for the projection formed on each of the first and second gripping jaws to be of rounded configuration at least in the area in which force can be introduced into the gripping jaw by the linear drive. Doing so optimizes the wear resistance of the force-transmitting mechanism, respectively the coupling between the linear drive and the two gripping jaws.

With respect to the linear drive configured in the gripper housing, it is conceivable for same to comprise a working chamber able to be pressurized by a preferably pneumatic pressurizing means and a piston displaceable in the working chamber and which can move when acted upon by the pressurizing means, wherein the piston is or can be coupled to the first and the second gripping jaw.

Alternatively hereto, it is also conceivable for the linear drive to comprise a working chamber, able to be pressurized by a preferably pneumatic pressurizing means, which is at least partly of elastic configuration so that an elongating of the working chamber occurs at least in the longitudinal direction of the gripper when acted upon by the pressurizing means. Said elongating of the working chamber in the longitudinal direction of the gripper when acted upon by the pressurizing means constitutes a linear movement, which is preferably introduced into the two rotating jaws via the respective projections.

The inventive solution is however by no means limited to a pneumatically actuated gripper. Hydraulic or electric linear drives are of course in fact also conceivable.

So as to be able to achieve a coordinated closing or opening of the gripper, one preferential further development of the inventive solution provides for at least one return element which interacts with at least one of the two gripping jaws such that the at least one gripping jaw is moved into its direction of closing, or its direction of opening respectively, when no linear force is being introduced into the gripping jaws by the linear drive. Particularly lending itself hereby to being such a return element is a tension spring (for effecting a coordinated closing of the gripping jaws upon nonactivated linear drive) or, alternatively, a pressure spring (for effecting a coordinated opening of the gripping jaws upon nonactivated linear drive), the first end of which is connected to the first gripping jaw and the second end of which is connected to the housing of the gripper or to the second gripping jaw.

In conjunction hereto, it is particularly advantageous for the gripper to be designed such that actuation of the linear drive effects a closing motion of the gripping jaws whereas when the linear drive is not being actuated, the gripping jaws are moved into their direction of opening by means of a return element.

With respect to the gripper housing, it is preferentially provided for same to be of jaw-shaped design and exhibit an upper as well as a lower housing side, between which the gripping jaws are pivotably accommodated. It may be particularly expedient for the first and second gripping jaw to each be pivotably mounted relative to the housing by means of a pivot pin, whereby the pivot pin engages with corresponding receiving elements formed in the upper and/or lower housing side.

In terms of the assembly and mounting of the gripper, one preferential further development of the latter embodiment provides for the receiving elements of the upper and/or lower housing sides, which receive the pivot pins of the gripping jaws, to be designed as through holes so that the pivot pins can be inserted into the gripper and/or replaced from the outside. In order to thereby prevent the pivot pins from inadvertently falling out of the receiving elements designed as through holes, the through holes can be closed to the outside by a cover which is preferably detachably connected to the housing side. This realization in particular enables the gripper to be assembled without the need for a retaining ring, which substantially simplifies the assembly/disassembly and/or maintenance of the gripper.

In conjunction hereto, it is particularly advantageous for the cover to be detachably connected to the housing side by means of a bolted connection (screw).

As stated above, the present invention is particularly characterized by the synchronizing of the pivoting movements of the two gripping jaws, enabling the realizing of a dual operating principle. Synchronizing the pivoting movements of the two gripping jaw can be realized in a particularly simple way by means of a circular cylindrical section which is accommodated in the circularly segmented cut-outs respectively formed in each of the two gripping jaws.

Since the circular cylindrical section is subject to wear during the operation of the gripper, it is particularly preferentially provided for the circular cylindrical section, respectively the synchronizing element, to be at least partly made from plastic, particularly PEEK, POM or PPS (polyphenylene sulfide). These plastic materials are self-lubricating, impact-resistant and relatively lightweight compared to metal and, as such, are optimally suited to the proposed application. Alternatively or additionally hereto, it is likewise of advantage for the circular cylindrical section or the synchronizing element respectively to be at least in part made from a ceramic material. This is in particular advantageous in terms of wear resistance.

It is of course also conceivable for further components of the gripper, particularly the gripping jaws, to be made at least in part of plastic, particularly PEEK, POM or PPS (polyphenylene sulfide), particularly so as to reduce the manufacturing costs, but also the total weight of the gripper.

BRIEF DESCRIPTION OF THE DRAWINGS

The following will reference the accompanying drawings in describing an embodiment of the inventive solution in greater detail.

Shown are:

FIGS. 3*a* to 3*c*: different positions of the gripping jaws in the example embodiment of the gripper to illustrate the operating action of the synchronizing element.

DETAILED DESCRIPTION

The following will reference the accompanying drawings in describing the configuration and functioning of an example embodiment of the inventive gripper 1 in greater detail. In this example embodiment, the gripper 1 is designed as a pneumatically actuated gripper; however, the manner of actuating the gripper 1 is not to be construed as being limiting.

Figure 1:
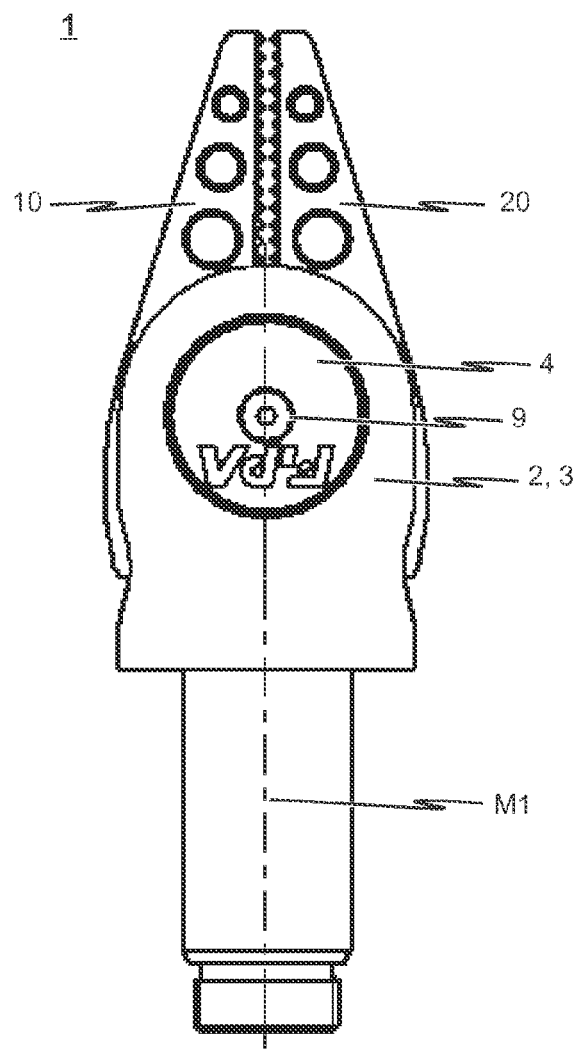
FIG. 1: a top plan view of an example embodiment of the gripper.
Figure 2:
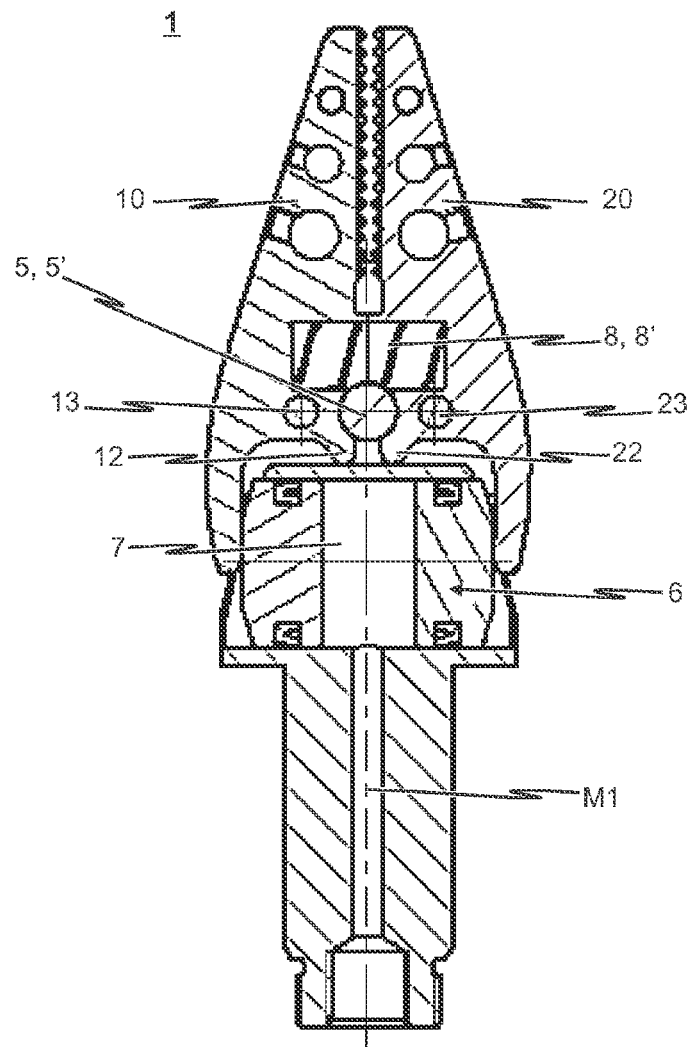
FIG. 2: a longitudinal sectional view of the gripper according to FIG. 1.
Figure 4:
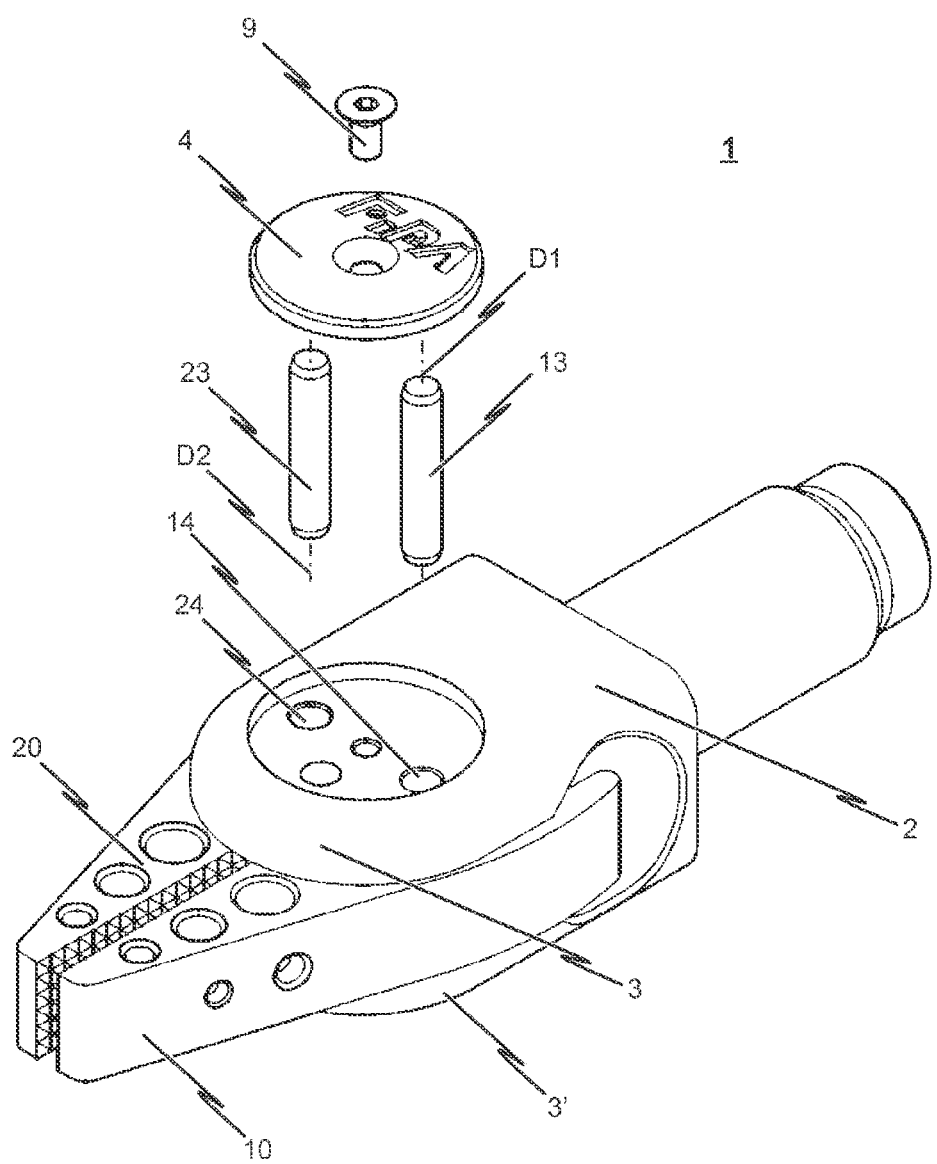
FIG. 4: a perspective partly exploded view of the example embodiment of the gripper.

As can particularly be noted from the illustrations of FIGS. 1 and 2, the gripper 1 has a housing 2 in which a linear drive is disposed. As shown by the FIG. 4 illustration, the housing 2 of the example embodiment is of jaw-shaped design and exhibits an upper as well as a lower housing side 3, 3'. A total of two gripping jaws 10, 20 of the gripper 1 are pivotally accommodated between the two housing sides 3, 3'.

The two gripping jaws 10, 20 are of mirror-symmetrical configuration with regard to a center longitudinal axis M1 of the gripper 1. The pivotability of the two gripping jaws 10, 20 relative to the housing 2 is realized in the depicted example embodiment by means of two pivot pins 13, 23 which define the rotational axes D1, D2 of the two gripping jaws 10, 20.

So that the gripping jaws 10, 20 can be pivoted relative to the housing 2 about the rotational axes D1, D2 defined by the pivot pins 13, 23, a linear drive 6 is disposed in the housing 2. Upon being actuated, the linear drive 6 produces a linear force acting in the longitudinal direction of the gripper 1 which is introduced into the two gripping jaws 10, 20 and converted into a pivoting movement.

The depicted example embodiment makes use of a pneumatically actuable linear drive 6. Specifically, the linear drive 6 comprises a working chamber 7 able to be pressurized by pneumatic pressurizing means. An elongation of the working chamber 7 in the longitudinal direction of the gripper 1 occurs when the pressurizing means acts upon the working chamber 7. This longitudinal elongation produces a linear force to pivot the two gripping jaws 10, 20.

In detail, the linear force produced by the linear drive 6 is introduced into each of the respective gripping jaws 10, 20 by means of a projection 12, 22. The two projections 12, 22 of the first and second gripping jaws 10, 20 are eccentrically disposed to the respective rotational axis D1, D2 of the gripping jaws 10, 20 and face the linear drive 6, as can particularly be seen in the FIG. 2 and FIG. 3 depictions. The linear force produced upon the actuation of the linear drive 6 is introduced into the respective gripping jaw 10, 20 by means of these projections 12, 20.

It can further be noted from the FIG. 2 depiction that the two projections 12, 20 formed on the respective gripping jaws 10, 20 are of rounded configuration at least in the area in which force can be introduced into the gripping jaw 10, 20 by the linear drive 6.

The example embodiment of the inventive gripper 1 makes further use of a return element 8 in the form of a pressure spring 8' which in FIG. 2 is depicted schematically. The first end of the pressure spring 8' is connected to the first gripping jaw 10 and the second end is connected to the second gripping jaw 20 such that the two gripping jaws 10, 20 will be moved in their direction of opening when there is no linear force being introduced into the gripping jaws by the linear drive 6.

A synchronizing element 5, by means of which the two gripping jaws 10, 20 are coupled, is utilized in order to be able to synchronize the movement of the two gripping jaws 10, 30 in the example embodiment of the inventive gripper 1 and to also in particular enable a self-centering of the gripping jaws 10, 20. In detail, the synchronizing element 5 of the example embodiment of the inventive gripper 1 is configured as a circular cylindrical section 5', its longitudinal axis L1 running parallel to the rotational axes D1, D2 of the first and second gripping jaws 10, 20. As can be seen particularly from the FIG. 2 depiction, the longitudinal axis L1 of the circular cylindrical section 5' intersects the center longitudinal axis M1 of the gripper 1 perpendicularly.

The following will reference the FIG. 3a to FIG. 3c depictions in describing the functioning of the synchronizing element 5 in greater detail.

In detail, the circular cylindrical section 5' of the synchronizing element 5 is accommodated in circularly segmented cut-outs 11, 21 in the example embodiment of the inventive gripper 1, said cut-outs formed in the first and in the second gripping jaw 10, 20 and respectively adapted to the diameter of the circular cylindrical section 5'. The circular cylindrical section 5' is thereby removably accommodated in the two circularly segmented cut-outs 11, 21 of the gripping jaws 10, 20.

In the state depicted in FIG. 3a, in which the gripping jaws 10, 20 are closed, the longitudinal axis L1 of the circular cylindrical section 5' and the rotational axes D1, D2 of the first and second gripping jaws 10, 20 lie in the same plane. As soon as a linear force is introduced into the respective gripping jaws 10, 20 by means of the projections 12, 22 disposed eccentrically to the rotational axes D1, D2, a pivoting movement of the two gripping jaws 10, 20 occurs in an opening direction of the gripper 1. At the same time, the circular cylindrical section 5' displaces along the center longitudinal axis M1 of the gripper 1 in the direction of the linear force and effects a synchronizing of the pivoting motion of the two gripping jaws 10, 20, as can particularly be seen in the FIG. 3b and FIG. 3c depictions. The maximum opening of the gripping jaws 10, 20 is reached when the two projections 12, 22 meet, as can be seen in the FIG. 3c depiction.

The following will reference the FIG. 4 depiction in describing the assembly of the example embodiment of the inventive gripper 1 in greater detail.

As stated above, the housing 2 of the gripper 1 is of jaw-shaped design in the example embodiment and exhibits an upper as well as a lower housing side 3, 3', between which the gripping jaws 10, 20 are pivotably accommodated. In detail, pivot pins 13, 23 are utilized, by means of which the first and second gripping jaws 10, 20 are each pivotably mounted relative to the housing 2. The pivot pins 13, 23 are accommodated in or engage with respective receiving elements 14, 24 formed in the upper and/or lower housing side 3, 3'. In the example embodiment depicted in FIG. 4, the receiving elements 14, 24 are configured as through holes so that the pivot pins 13, 23 can be inserted into or replaced in the gripper from the outside.

The receiving elements 14, 24 configured as through holes are preferably closed to the outside by a cover 4, wherein said cover 4 can be detachably connected to the respective housing side 3. A bolted connection 9 detachably connecting the cover 4 to the housing side 3 lends itself particularly well here.

The present invention is not limited to the example embodiment of the inventive gripper depicted in the drawings but rather yields from an integrated consideration of all the features disclosed herein.

It is in particular conceivable in this context for at least some of the components of gripper 1 to be made of a plastic material, particularly PEEK, POM or PPS (polyphenylene sulfide). It may be advantageous for at least the synchronizing element 5 and/or the gripping jaws 10, 20 to at least in part be made of plastic.

The invention claimed is:

1. A gripper (1) comprising:
a housing (2) in which a linear drive (6) is disposed;
a first gripping jaw (10) and a second gripping jaw (20), each mounted on the gripper (1) so as to be pivotable about a rotational axis (D1, D2) relative to the housing (2);
a synchronizing element (5) which couples together the first and second gripping jaws (10, 20), the synchronizing element (5) including a circular cylindrical section (5') and defining a longitudinal axis (L1) which runs parallel to the rotational axes (D1, D2) of the first and second gripping jaws (10,20); and a circularly segmented cut-out (11, 21) formed in the first and second gripping jaws (10, 20) and configured to receive the circular cylindrical section (5'), wherein the first and second gripping jaws (10, 20) are coupled to the linear drive (6) such that a linear movement produced by the linear drive (6) is converted into pivoting movements of the first and second gripping jaws (10, 20) in respective opening directions or closing directions of the first and second gripping jaws (10, 20), wherein the pivoting movements of the first and second gripping jaws (10, 20) are synchronized, wherein the circular cylindrical section (5') is removably accommodated in the two circularly segmented cut-outs (11, 21) of the gripping jaws (10, 20), and wherein the synchronizing element (5) is configured such that removal of the circular cylindrical section (5') disables the synchronizing of the two gripper jaws (10, 20) but does not disable the function of the linear movement produced by the linear drive (6) from being converted into the pivoting movements of the first and second gripping jaws (10, 20) in the opening directions or the closing directions of the first and second gripping jaws (10, 20).

2. The gripper (1) according to claim 1, wherein the first and second gripping jaws (10, 20) have a mirror-symmetrical configuration with respect to a center longitudinal axis (M1) of the gripper (1).

3. The gripper (1) according to claim 2, wherein the longitudinal axis (L1) of the circular cylindrical section (5') intersects the center longitudinal axis (M1) of the gripper (1) perpendicularly.

4. The gripper (1) according to claim 1, wherein the longitudinal axis (L1) of the circular cylindrical section (5') and the rotational axes (D1, D2) of the first and second gripping jaws (10, 20) lie in the same plane when the first and second gripping jaws (10, 20) are in a closed state.

5. The gripper (1) according to claim 1, wherein the first and second gripping jaws (10, 20) each include a projection (12, 22) eccentrically disposed relative to the respective gripping jaw (10, 20) rotational axis (D1, D2) which faces the linear drive (6), wherein a linear force is introduced into the first and second gripping jaws (10, 20) through the projections (12, 22) upon the actuation of the linear drive (6).

6. The gripper (1) according to claim 5, wherein the projections (12, 22) are of rounded configuration at least in an area in which the linear force can be introduced into the gripping jaw (10, 20) by the linear drive (6).

7. The gripper (1) according to claim 1, wherein the linear drive (6) comprises a working chamber (7) able to be pressurized by a pressurizing means and a piston displaceable in the working chamber (7) which can move when acted upon by the pressurizing means, wherein the piston is coupled to or coupleable to the first and second gripping jaws (10, 20).

8. The gripper (1) according to claim 1, wherein the linear drive (6) comprises a working chamber (7), able to be pressurized by a pressurizing means, and which is at least partly elastic so that an elongating of the working chamber (7) occurs in a longitudinal direction of the gripper (1) when acted upon by the pressurizing means.

9. The gripper (1) according to claim 1, including at least one return element (8) which interacts with at least one of the first and the second gripping jaws (10, 20) such that the at least one of the first and second gripping jaws (10, 20) is moved into a respective closing direction or an opening direction when the linear force is not being introduced into the gripping jaws (10, 20) by the linear drive (6).

10. The gripper (1) according to claim 9, wherein the at least one return element (8) comprises a tension or pressure spring (8'), a first end of which is connected to the first gripping jaw (10) and a second end of which is connected to the second gripping jaw (20).

11. The gripper (1) according to claim 1, wherein the housing (2) is of jaw-shaped design and includes an upper as well as a lower housing side (3, 3'), between which the first and second gripping jaws (10, 20) are pivotably coupled.

12. The gripper (1) according to claim 11, wherein the first and second gripping jaws (10, 20) are each pivotably mounted relative to the housing (2) by a pivot pin (13, 23), wherein the pivot pin (13, 23) engages with corresponding receiving elements (14, 24) formed in the upper and/or the lower housing side (3, 3').

13. The gripper (1) according to claim 12, wherein the receiving elements (14, 24) provided in the upper and/or lower housing sides (3, 3') are through holes.

14. The gripper (1) according to claim 13, wherein the through holes are configured to be closed to the outside by a cover (4).

15. The gripper (1) according to claim 14, wherein the cover (4) is detachably connected to the housing side (3, 3') by a bolted connection (9).

16. The gripper (1) according to claim 1, wherein the synchronizing element (5) is at least partly made from plastic.

17. The gripper (1) according to claim 1, wherein the synchronizing element (5) is at least partly made from ceramic material.

18. The gripper (1) according to claim 1, wherein the first and the second gripping jaws (10, 20) are at least partly made from plastic.

19. The gripper (1) according to claim 18, wherein the first and second gripping jaws (10, 20) are at least partly made from at least one of polyetheretherketone, polyoxymethylene and polyphenylene sulfide.

20. The gripper (1) according to claim 1, wherein the linear drive (6) is a pneumatically actuatable linear drive (6).

\* \* \* \* \*